P. P. LA MONTAGNE & P. GABLE.
KNITTING MACHINE.
APPLICATION FILED SEPT. 16, 1914.
1,282,880.
Patented Oct. 29, 1918.
5 SHEETS—SHEET 1.
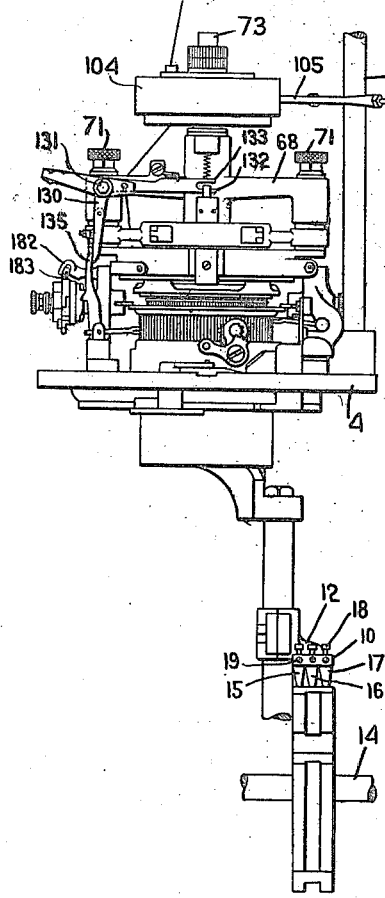
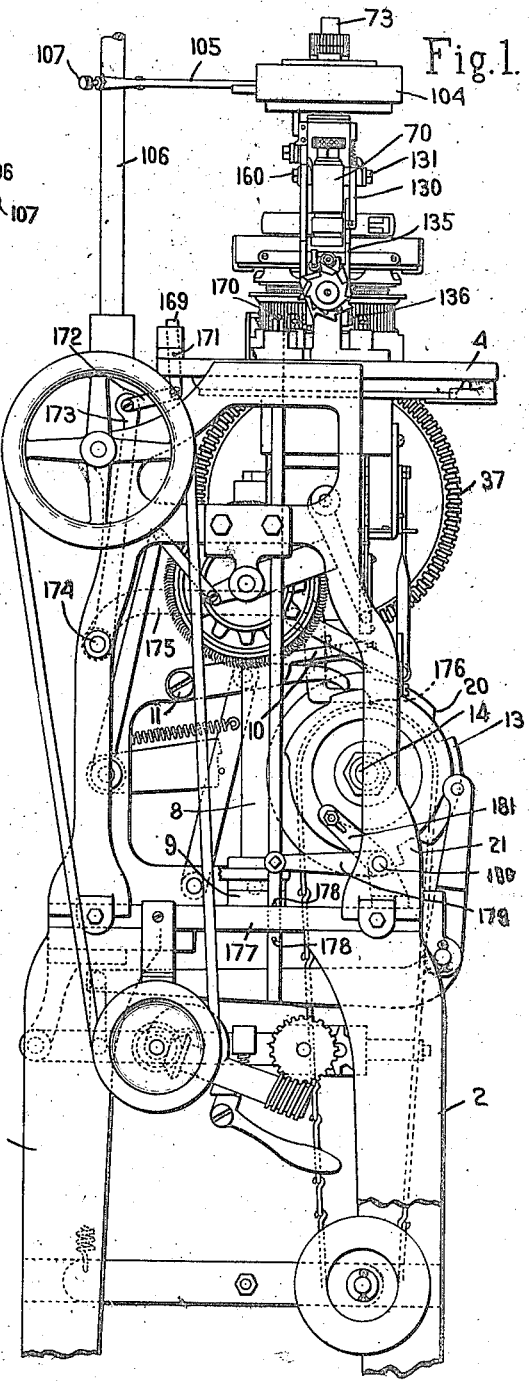
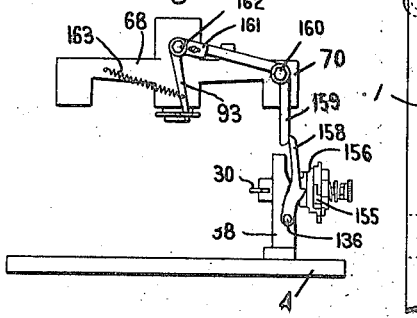
Witnesses.
J. Morrill Fuller
William E. Gagen
Inventors.
Peter Gable
Patrick P. La Montagne,
by Heard Smith
Atty's.

P. P. LA MONTAGNE & P. GABLE.
KNITTING MACHINE.
APPLICATION FILED SEPT. 16, 1914.
1,282,880.
Patented Oct. 29, 1918.
5 SHEETS—SHEET 2.
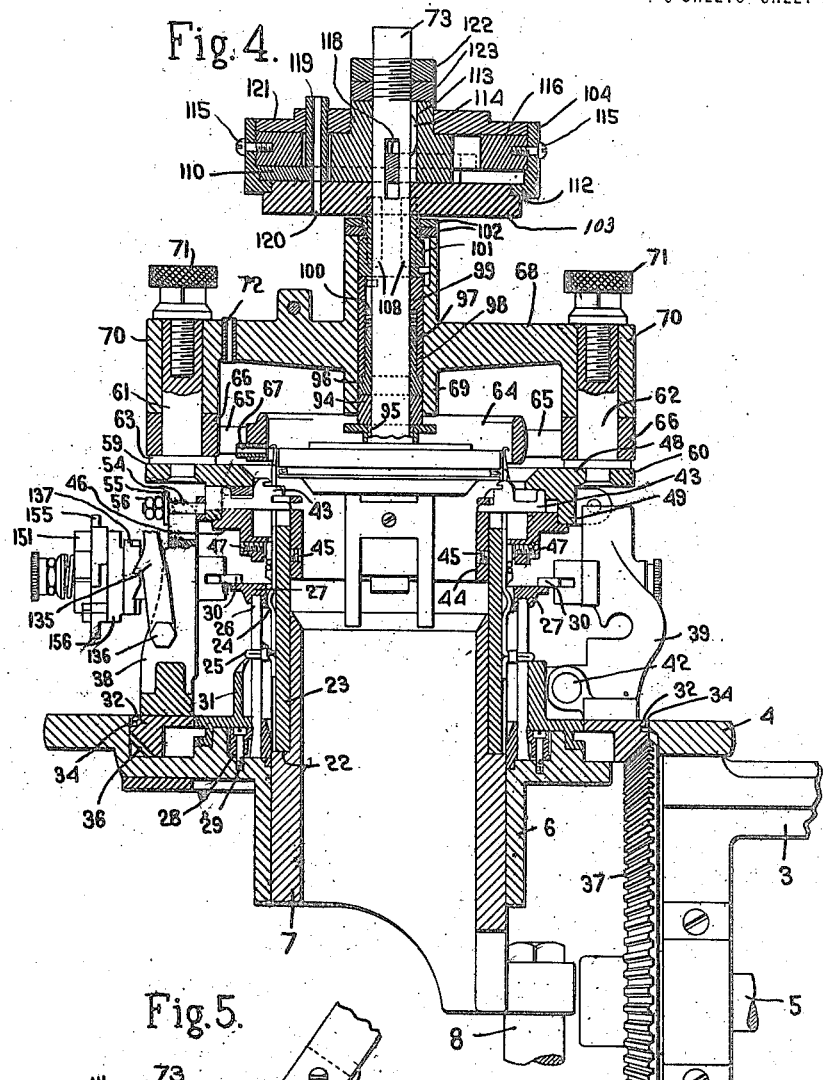
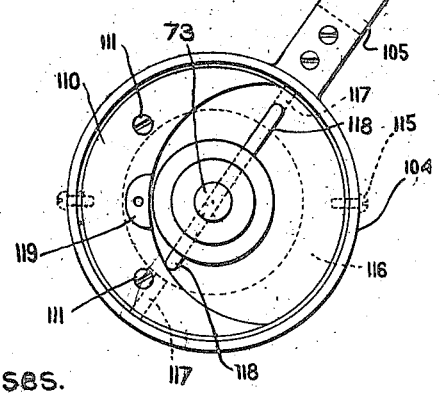
Witnesses.
J. Morrill Fuller
William E. Gagen
Inventors.
Peter Gable,
Patrick P. La Montagne,
by Heard Smith & Tennant.
Atty's.

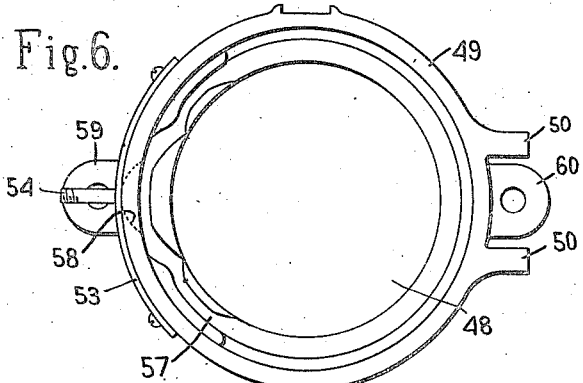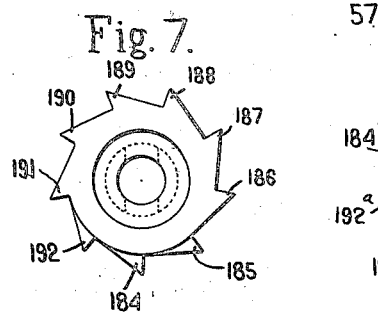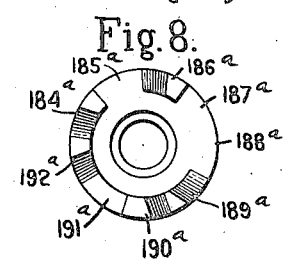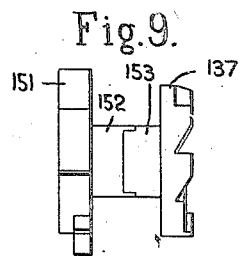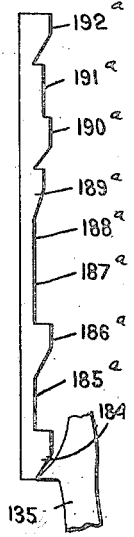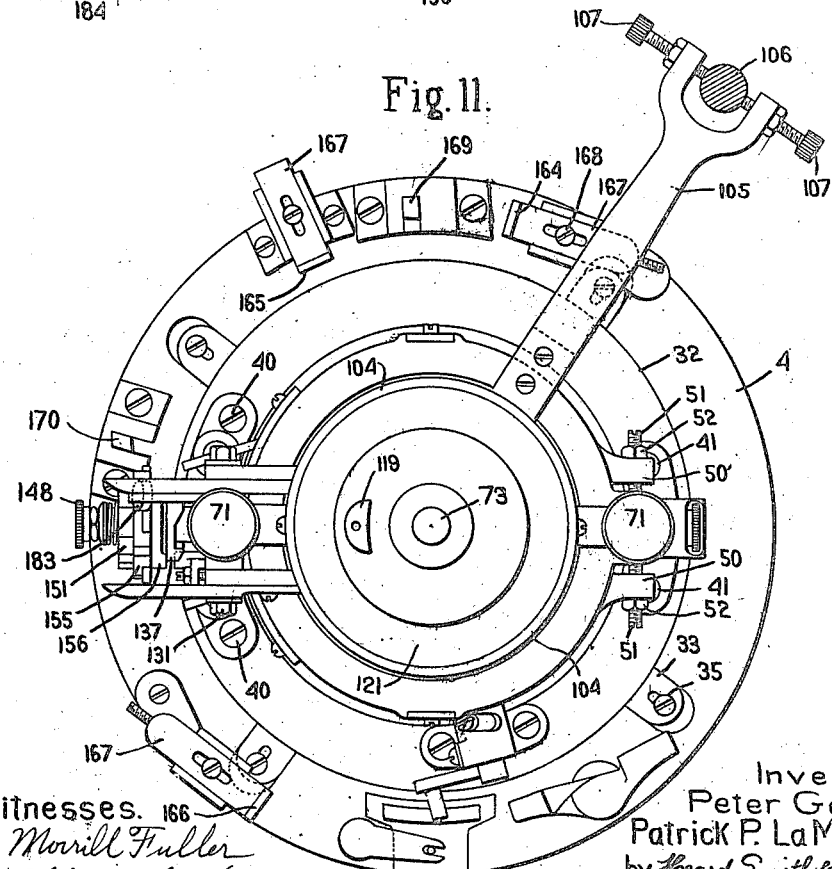

P. P. LA MONTAGNE & P. GABLE.
KNITTING MACHINE.
APPLICATION FILED SEPT. 16, 1914.

1,282,880.

Patented Oct. 29, 1918.
5 SHEETS—SHEET 4.

Witnesses.
J. Morrill Fuller
William E. Gagen

Inventors.
Peter Gable,
Patrick P. LaMontagne,
by Heard Smith & Tennant
Atty's.

P. P. LA MONTAGNE & P. GABLE.
KNITTING MACHINE.
APPLICATION FILED SEPT. 16, 1914.

1,282,880.

Patented Oct. 29, 1918.
5 SHEETS—SHEET 5.

Witnesses.
J. Morrill Fuller
William E. Gagen

Inventors.
Peter Gable,
Patrick P. La Montagne,
by Heard, Smith & Tennant.
Atty's.

UNITED STATES PATENT OFFICE.

PATRICK P. LA MONTAGNE, OF BOURBONNAIS, AND PETER GABLE, OF KANKAKEE, ILLINOIS, ASSIGNORS TO PARAMOUNT KNITTING COMPANY, OF CHICAGO, ILLINOIS, A CORPORATION OF ILLINOIS.

KNITTING-MACHINE.

1,282,880.   Specification of Letters Patent.   Patented Oct. 29, 1918.

Application filed September 16, 1914.   Serial No. 862,102.

*To all whom it may concern:*

Be it known that we, PATRICK P. LA MONTAGNE, a citizen of the United States, residing at Bourbonnais, county of Kankakee, State of Illinois, and PETER GABLE, a citizen of the United States, residing at Kankakee, county of Kankakee, State of Illinois, have invented an Improvement in Knitting-Machines, of which the following description, in connection with the accompanying drawing, is a specification, like characters on the drawing representing like parts.

This invention relates to improvements in knitting machines and more particularly to a knitting machine designed to knit automatically from beginning to end a complete ribbed leg stocking, and more particularly a stocking in which the knitting begins at the toe end.

One feature of the invention consists in means for controlling and operating the two sets of needles upon the change from plain to ribbed work so as to prevent the formation of holes which usually occur at this point.

Another feature of the invention resides in means for controlling the operation of the needles to secure a proper finish to the top of the stocking, also a section of work to be raveled out and form a line of demarcation.

Another feature of the invention resides in an improved form of means for preventing the rotation of the dial and at the same time enabling the yarn to pass in either direction about the dial shaft as required in reciprocating knitting.

Another feature of the invention resides in the means for controlling the placing of the dial needles in and out of knitting position and for enabling the dial needles to be retracted, carrying the yarn without knitting off, and in general for controlling the operation of the dial needles as set forth in the specification.

Another feature of the invention resides in the star wheel and cam means controlled by the pattern mechanism for controlling the operation of the dial needles, and particularly in means for leaving the star wheel in position or insuring its being brought into position so that it will be in proper time when it is to respond to the action of the pattern mechanism.

These and many other features of the invention will appear more fully from the accompanying description and drawings and will be pointed out in the claims.

The drawings show so much of a knitting machine as is necessary to an understanding of the present invention. Many of the parts of the machine which are not involved in or concerned with this invention have been omitted and some of the parts indicated in a somewhat diagrammatic form in order that the disclosure of this invention may be clear and readily understood.

In the drawings:

Figure 1 is a side elevation of a knitting machine with many of the parts omitted and some given a diagrammatic form;

Fig. 2 is a front elevation of the head or upper portion of the machine;

Fig. 3 is a detail in rear elevation showing the connection for operating dial shifting plate locking pins;

Fig. 4 is a vertical transverse section of the upper portion of the machine taken chiefly on a plane passing transversely through the cylinder axis;

Fig. 5 is a plan view of the head for preventing rotation of the dial with the cover and ring thereof omitted. the periphery of the ring being shown in dotted lines;

Fig. 6 is a bottom plan view of the sinker cam ring, and cam;

Fig. 7 is an outer end elevation of the star wheel for controlling the cam for the dial needles;

Fig. 8 is an end view looking in the opposite direction from Fig. 7 of the cam connected with the said star wheel;

Fig. 9 is a side elevation of the said cam and its connected star wheel;

Fig. 10 is a development of the cam shown in Figs. 8 and 9;

Fig. 11 is a top plan view of the bed plate of the machine and the parts thereabove;

Figure 12:
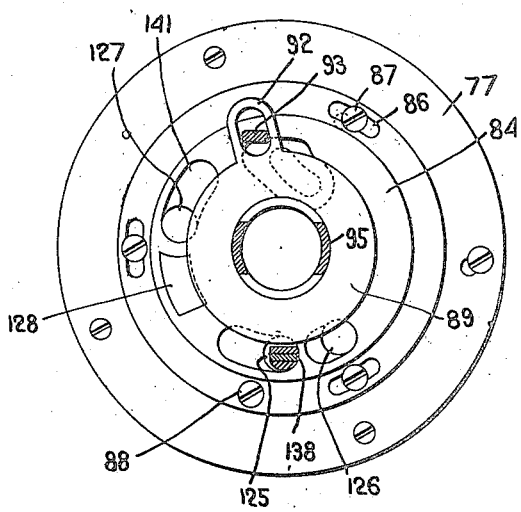
Fig. 12 is a top plan view with some of the parts in section of the superimposed dial cam carrier, adjustable locking plate, and shifting plate.
Figure 13:
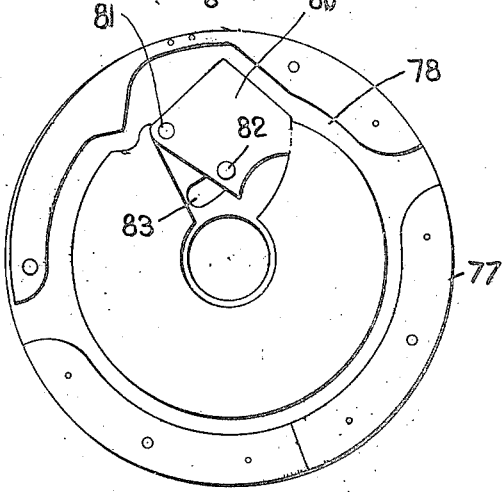
Fig. 13 is a bottom plan view of the dial cam carrier and dial cam.

The knitting machine illustrated in the drawings is particularly adapted for the knitting of ribbed legged stockings and contains provision therein for the knitting of plain, circular and ribbed work but as the details of such machines are well known and familiar to those skilled in the art and are not involved in the present invention they are not illustrated.

The frame of the machine is shown as comprising the vertical standards 1, 2 and 3 and the top plate 4, the main shaft is indicated at 5 and power is transmitted thereto in the usual manner.

The bed plate is provided with a depending tubular bearing 6 in which is mounted the tubular needle cylinder carrier 7. The cylinder carrier 7 is connected to a supporting rod 8 sliding at its lower end in a bearing 9 on the frame of the machine. A lever 10 fulcrumed at its rear end 11 on the frame of the machine passes beneath a projection 12 on the supporting rod 8 and is moved at the proper time by peripheral cam surfaces on the cam member 13 carried by the pattern shaft 14 of the machine.

The forward end of the lever 10 which bears upon the cam member 13 is provided with three spring fingers, 15, 16 and 17, the first of which in the construction illustrated acts during the knitting of the foot and ankle, the second 16 during the knitting of the ribbed leg, and the third 17 during the knitting of the heel and toe. These spring fingers are separately adjustable so that in coöperation with their respective peripheral cam surfaces the required movement of the lever 10 and consequently of the cylinder carrier 7 may be secured. For this purpose the spring fingers are shown as secured to the lever 10 at their rear ends and bent downwardly away from the lever at their forward ends. Adjusting screws 18 are provided in the lever 10 abutting against the top of the springs and locking screws 19 are mounted in the lever 10 and bear against the screws 18 so that the spring fingers may be accurately adjusted and locked in adjusted position. Thus the needle cylinder carrier may be raised and lowered as required and to the extent required to provide the proper length of stitch and vary the length of stitch during the various knitting operations. The cam member is also provided transversely of its periphery at the proper points with notches or depressions as indicated at 20 and 21 which cause the lever 10 and through its connections the cylinder carrier to be lowered to such a point as will prevent the cylinder needles from knitting off at times, and for the purpose which will be hereinafter explained.

The cylinder carrier 7 is surrounded by and supports on a shoulder 22 thereof the needle cylinder 23 vertically grooved on its outer periphery in the usual manner to receive and guide the cylinder needles 24.

The butts 25 of the needles are guided between the bars 26 of a skeleton cylinder the top plate of which is shown at 27 and the bottom plate at 28 secured by set screws 29 to the bed plate 4. The top plate 27 is held in place by hold-downs 30 enabling the bars 26 to be removed and replaced when required. An annular cam carrier 31 surrounds the skeleton cylinder and is mounted for rotation in the bed plate 4 and has its upwardly projecting hub-like projection provided with the usual cam surface for coöperating with the needle butts 25 to cause the movement of the needles. This cam carrier 31 is locked to and rotates with the gear ring 32 mounted for rotation in the bed plate 4. This gear ring is held in place by keys 33 radially mounted in the bed plate 4, fitting into grooves 34 in the periphery of the gear ring and locked by set screws 35. The gear ring on its lower surface is provided with beveled teeth 36 by means of which it is driven from the beveled gear 37 carried on the main shaft 5 of the machine.

Diametrically opposite posts 38 and 39 are rigidly secured to and project upwardly from the gear ring. As shown these posts are provided with circumferentially extended bases through which screws 40 and 41 pass into the gear ring. The cam carrier 31 is locked to the gear ring and is rotarily adjustable therewith by means of set screws 42 passing through flanges extending therefrom and abutting against opposite sides of the post 39.

Sinkers are provided, in the form of machine illustrated, which are withdrawn at the knitting point and thereafter move inwardly to carry the loops over the hooks of the needles and are then withdrawn slightly in a manner familiar in knitting. These sinkers are shown at 43 slidingly mounted at their forward ends in an annular sinker cylinder 44 secured by set screws 45 to the interior of the needle cylinder 23 and at their rear ends in an annular sinker guide 46 secured by set screws 47 to the exterior of the needle cylinder 23. A sinker cam ring 48 is removably mounted upon, and rotarily adjustable with respect to the posts 38 and 39 and the sinker guide 46. This sinker cam ring is shown with its cams separately in Fig. 6. It is provided with a depending annular flange 49 which rests upon the sinker guide 46. At one side it is provided with a pair of lugs 50, straddling the post 39, and through which set screws 51 pass and abut against the post and are held locked by nuts 52. At the opposite side, the sinker cam ring has rigidly secured to the exterior periphery of its depending flange a curved metal plate 53 from which projects a screw threaded pin 54. When the sinker cam ring is in place this pin fits in an open slot in the top of the post 38. A washer 55 and a pair of check nuts 56 enable the post to be clamped thus holding the sinker cam ring in place. This sinker cam ring serves as a support for all the mechanism located thereabove including the dial needles and their operating mechanism, and in the construction illustrated, this sinker cam ring with its supported parts may readily be removed by loosening the check nuts 56 and the set screws 51 by means of which it is held in place.

A cam groove 57 in the lower face of the sinker cam ring operates the sinkers and, at the knitting point, this cam groove is expanded into the depending flange 49 at 58 to allow the extreme retraction of the sinkers.

The sinker cam ring is provided with diametrically opposite extended flange portions 59 and 60 in which are mounted posts which support the mechanism above the cylinder including the dial, dial needles and the mechanism for operating the dial needles; these posts are shown at 61 and 62 and have their lower ends reduced and riveted into the flanges 59 and 60. Washers 63 surround the reduced portion of the posts and rest upon the flanges 59 and 60. An ordinary form of latch ring 64 is supported in proper juxtaposition to the needles by arms 65 extending diametrically therefrom and provided with hubs 66 fitting over the posts 61 and 62. This latch ring 64 is also shown as provided with a thread guide 67 through which the yarn is fed to the needles.

A yoke 68 presenting a central hub 69 and end hubs 70 is supported from the sinker cam ring with the hubs 70 fitting over the posts 61 and 62 and locked in place by set screws 71 secured into the upper ends of the posts and pressing the hubs 70 and the subjacent hubs 66 of the latch ring against the washers 63. This yoke supports the entire dial needle mechanism and the method of its mounting with respect to the cylinder needle mechanism is such as to secure one object of the invention, namely, the preservation at all times of the relative alinement and position of the two sets of needles. This is very important especially in connection with dial needles having a short throw, and obviates the objections heretofore encountered in knitting machines due to the two sets of needles getting out of alinement and relative position.

The yoke is provided with a thread guide 72 through which the yarn passes from above to the thread guide 67. The dial shaft 73 extends up centrally through the hub 69 and has mounted thereon at its lower end, as by the set screw 74, the usual dial 75. The dial needles are shown at 76 mounted in radial grooves in the upper surface of the dial. The dial needles are shown of the separate latch type illustrated and described in Patent No. 1,096,945, granted May 19, 1914 to Pope and Randall. A dial cam carrier 77 is rotarily mounted on the dial shaft 73 and is provided on its lower face with cam plates presenting therebetween the cam groove 78 which acts upon the butts 79 of the dial needles to secure the proper movement thereof. At the knitting point a switch plate 80 is provided and is pivotally mounted at 81 in the dial cam carrier. A pin 82 on the switch plate extends upwardly through a slot 83 in the cam carrier and serves as a means by which the switch plate may be swung about its pivot 81 to bring the dial needles into knitting position or allow them to be withdrawn therefrom. A rotarily adjustable locking plate 84 having an upwardly extended hub 85 is mounted on the dial shaft 73 and rests upon the dial cam carrier 77. This locking plate is provided with circumferential slots 86 fitting over set screws 87 in the dial cam carrier 77 and is locked in the required rotary adjustment by the set screw 88. The dial cam carrier with its cams and the adjustable locking plate thus rotate together on the dial shaft 73 when locked to the yoke 68 and serve to give the required reciprocating movement to the dial needles.

Figure 14:
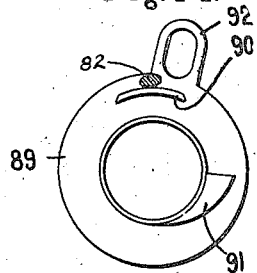
Fig. 14 is a bottom plan view of the shifting plate.
Figure 15:
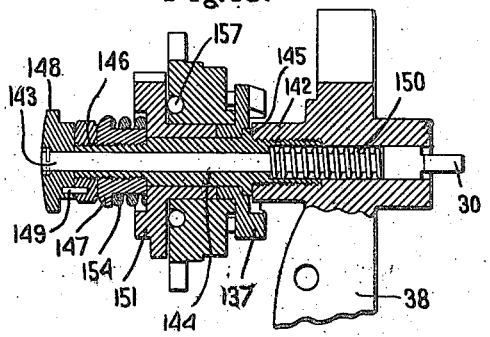
Fig. 15 is a view in vertical transverse section taken on the axis of the star wheels, and hold-down.
Figure 16:
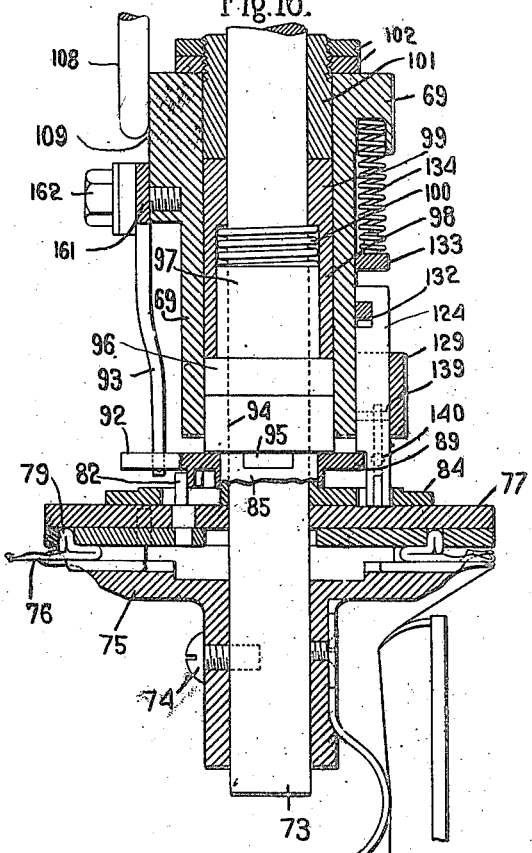
Fig. 16 is a view in vertical transverse section of the parts immediately concerned with the support and operation of the dial needles.

In order to secure the movement of the dial needles into retracted position while holding the yarn and without knitting off, a movement which takes place, in accordance with this invention, at the time of the change from plain circular to ribbed knitting or which takes place at the conclusion of the ribbed knitting, means are provided for controlling the movement of the dial needles to secure this result. For this purpose a shifting plate 89 is rotarily mounted on the hub 85 of the adjustable locking plate so that when this shifting plate is shifted rotarily of the locking plate it may control the position of the switch plate 80. In the construction illustrated the shifting plate 89 is provided on its lower surface with a concentric depending flange 90 and a depending cam projection 91, the arc and shape of this depending flange and depending cam being substantially as shown in Fig. 14. This flange and cam act upon the pin 82 at the required times. When the pin 82 is in the position shown in Fig. 14 against the flange 90 the switch plate 80 will be held in its projected or outer position. The cam 91 at the proper time acts upon the pin 82 and shifts the switch plate 80 from its retracted position to its outer position. The shifting plate 89 is provided with a projecting slotted lug 92 which receives a locking pin 93 carried by the rotating yoke 68 and by means of which, as will be described, the rotary shift of the shifting plate with respect to the dial cam carrier is secured at the required times.

A bearing member 94 is interposed between the lower end of the yoke hub 69 and the dial shaft 73 and is keyed by depending flanges 95 to the hub 85 of the adjustable locking plate. Above this bearing member 94 on the dial shaft 73 is mounted a second bearing member 96 having a flange 97 telescoping within the depending flange 98 of a third bearing member 99. The bearing member 99 is keyed to the dial shaft 73 and a helical spring 100 is interposed between it and the flange 97 of the second bearing member 96. A fourth bearing member 101 is located above the bearing member 99 and is keyed to the hub 69 of the yoke. Check nuts or washers 102 are threaded on to the projecting end of the bearing member 101 and rest upon the top edge of the hub 69 of the yoke. The bearing member 101 abuts against the bottom of the plate 103 which forms part of the head by which rotation of the dial shaft 73 is prevented and the details of which will be described later. The check nuts 102 thus provide a means by which the dial shaft 73 and its supported parts may be adjusted vertically to vary vertically the position of the dial needles and the spring 100 serves to keep all the parts surrounding the dial shaft 73 tight and thus to prevent rattling and lost motion. The spring 100 also through the bearing members described presents a yielding brake on the dial cam carrier 77 and prevents it overrunning by momentum.

The head by means of which the dial shaft 73 is kept from rotating along with the yoke 68 in which it is mounted is illustrated in Figs. 4 and 5 and presents novel features. The casing ring 104 has projecting therefrom an arm 105 which extends radially outward and embraces and is adjustably connected to some fixed portion of the machine such as the usual bobbin supporting rod 106.

Adjustment of the arm 105 and consequently of the casing ring 104 with respect to the bobbin supporting rod is provided to enable the proper assembling of the parts, and is shown as comprising a pair of set screws 107 in the forked ends of the arm 105 abutting against the bobbin supporting rod. The plate 103 of the head is secured by pins 108 mounted therein and projecting downwardly and contacting with the slabbed off or flat portion 109 of the hub 69 of the yoke so that the plate rotates in unison with the yoke 68. A cam 110 is secured to the top surface of the plate 103 by set screws 111. The plate 103 is recessed at its upper peripheral end to receive an inwardly projecting flange 112 on the casing ring 104, and the cam 110 rests upon the top of this flange. A hub 113 resting upon the plate 103 surrounds the shaft 73 and is keyed thereto at 114 so as to permit of longitudinal adjustment with respect to the shaft, but be prevented from radial movement with respect thereto. The casing ring 104 has rigidly secured thereto as by the set screws 115 a concentric locking ring 116 diametrically slotted or notched at 117 and resting upon the cam 110. A locking bolt 118 extends in each direction through a slot in the hub 113 and shaft 73 and is of such length that it is always in engagement with one of the slots or notches 117 in the locking ring 116 so as thus to prevent rotation of the shaft 73 with respect to the locking ring, and consequently, with respect to the frame work of the knitting machine. This locking bolt 118 is of such a length, however, that after one end has entered one of the slots or notches 117 the other end has withdrawn from the opposite slot or notch. The cam 110 is symmetrically constructed and its cam surface is in the same plane as the ends of the locking bolt 118 so that as this cam rotates about the shaft 73 it moves the locking pin into and out of engagement with the slots or notches, and as the cam is symmetrical this takes place in whichever direction the yoke may be rotated. The cam is provided with a yarn guide or carrier 119 shown as a tubular projection secured to and projecting vertically up from the cam. This yarn guide alines with an opening 120 in the plate 103 and also projects up through an opening in a cover plate 121 which rests upon the locking ring 116 and fills the space between the casing ring 104 and the hub 113. The upper end of the shaft 73 is screw-threaded and provided with a pair of lock nuts 122, 123, the lower one of which 123 abuts against the top of the hub 113.

It will thus be seen that as the yarn guide 119 rotates carrying with it the yarn, the yarn will pass freely around the dial shaft 73, the locking bolt 118 withdrawing successively by the action of the cam 110 from one or the other of the slots or notches 117 as the yarn guide comes opposite them.

The mechanism for throwing into and out of operation and controlling the movement of, and supplying the yarn to, the dial needles involves novel features and will now be described. The machine as illustrated is designed for the knitting of a ribbed legged stocking in which the knitting begins at the toe end in which a continuous series of stockings are knit in a single web and then separated by severing at indicated points. It will be apparent to one skilled in the art that the specific mechanism herein illustrated and particularly described is simply typical and that by proper alteration of the cams, pins, pattern mechanism, and other controlling parts the machine may be constructed and arranged to perform a variety of operations according to particular conditions arising.

One important feature of the invention resides in providing means for giving a peculiar operation to the needles upon the change from plain to ribbed work and again upon the conclusion of ribbed work whereby novel and valuable results are secured. When the knitting proceeds from the plain portion to the ribbed portion the line of juncture between the plain and ribbed portions is usually marked by a row of holes quite noticeable and caused by the dial needles holding up the yarn which in the case of the plain work passes directly across between the loops formed on the cylinder needles, thus presenting a line of juncture not only unsatisfactory in appearance but also presenting a weak line in the fabric along which in the case of hosiery a separation is not infrequently effected in the use of the articles.

Figure 17:
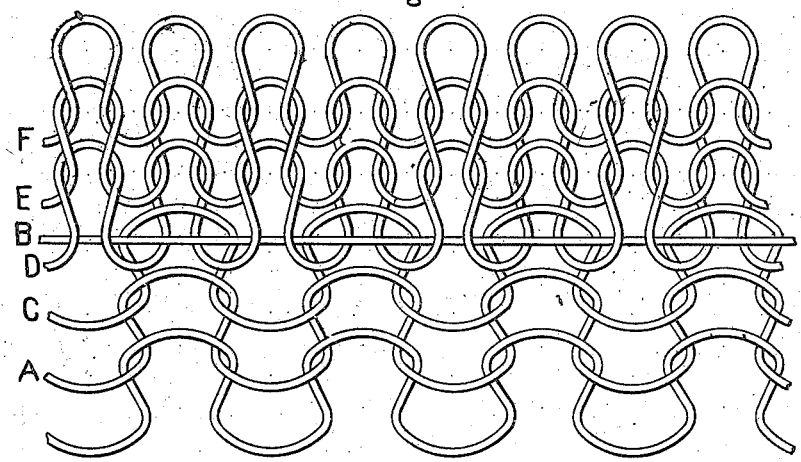
Fig. 17 is an enlarged detail and somewhat diagrammatic view showing a section of the knitted material produced at the joint on the change from plain to ribbed work.
Figure 18:
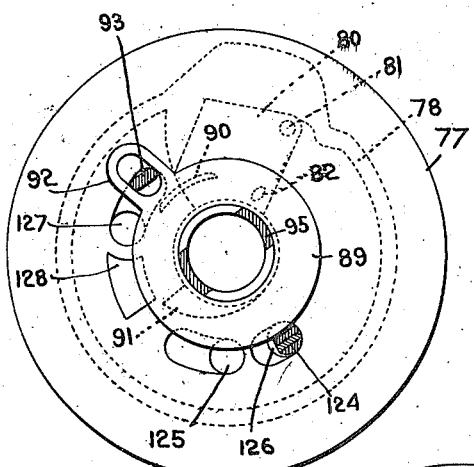
Fig. 18 is a top plan view somewhat diagrammatical with some of the parts in section and similar to Fig. 12, but with the parts in position for plain knitting.
Figure 19:
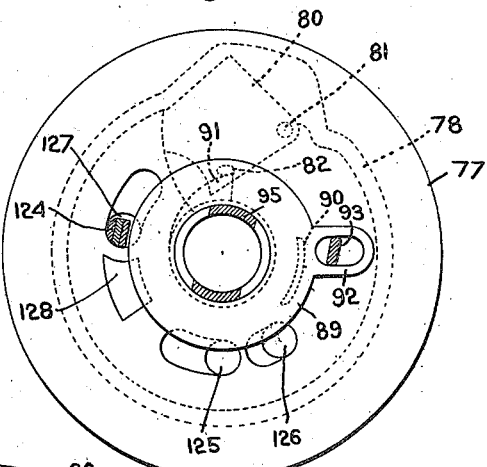
Fig. 19 is a view similar to Fig. 18, but with the parts in position for knitting as for ribbed work but without the needles knitting off.
Figure 20:
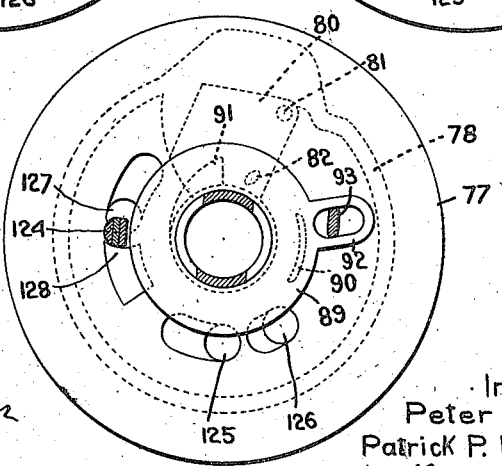
Fig. 20 is a view similar to Fig. 18 but with the parts in position for knitting as for plain work but with the dial needles retracted and holding the previously laid course.

In this invention the holes which otherwise would occur at the juncture of the change from plain to ribbed work are filled and the line of juncture strengthened by mechanism which operates as follows (see Fig. 17):

After the final course A of plain knitting the succeeding course B is laid as for ribbed work but without the needles knitting off. To do this requires that the cylinder needles be prevented from casting off the loops of the final course A of plain knitting. This is done by giving a relative movement of the cylinder carrier 7 with respect to the cylinder needles or, in the construction illustrated, by lowering the cylinder carrier 7 so that as the cylinder needles retract the yarn of the final course A of plain knitting will still remain thereon. The dial needles will not cast off because the yarn of this final course A was not placed upon the dial needles, that course being plain work alone. The second succeeding course C is then laid as for plain work, that is, in the cylinder needles alone and knit off as for plain work. This requires that upon completion of the first succeeding course B the dial needles shall either be thrown out of action or retracted holding the yarn of that course B, that the cylinder needles shall be restored to knitting position as by raising the cylinder carrier 7, that the yarn shall then be laid for the second succeeding course C only in the cylinder needles and that as this course C is laid the loops of the final course A and the first succeeding course B shall be cast off from the cylinder needles thus leaving the first succeeding course B held only by the dial needles and the second succeeding course C held only by the cylinder needles. The dial needles are then thrown into action and succeeding courses D, E, F, etc., knit as for ribbed work in the usual manner.

This leaves a course B of yarn extending across the holes which usually appear at the juncture of the plain and ribbed knitting thus filling the holes or reducing them to a size where they are not noticeable. At the same time the joint is strengthened.

This invention also provides means by which at the conclusion of the ribbed work as at the top of the leg-portion of the stocking a welt is formed of any desired width; a course of lock stitches is formed to prevent the raveling back of the yarn; and then a few courses of ribbed work are knit which when raveled out under the tension applied to the knit web present a clearly defined zone or line of demarcation between the successive stockings so that the stocking may be readily cut apart at this place.

It is obvious that the finishing of the stocking after the conclusion of the ribbed knitting may be varied considerably along the lines just set forth, but as a preferred arrangement for securing the desired results the mechanism is constructed and arranged to operate as follows: At the end of the ribbed work through the automatic controlling mechanism hereinafter more fully described, the rotary shifting plate 89 is shifted by the locking pin 93 to bring the dial needles into a position so that they take the yarn at each course but cast off only at every other course thus making a sort of tucking stitch by which the desired welt is produced. This operation is continued until the welt is of the required width. The locking pin 93 then acts again to shift the rotary shifting plate to restore the dial needles to position for knitting ribbed work and a narrow section of ribbed work is then knit. Then the cylinder is next lowered, in the construction illustrated, all of the springs 15, 16, 17 dropping into a recess in the cam 13. The cylinder remains in this lowered position during one course of knitting and during this course the cylinder needles pull down the yarn for the dial needles and the dial needles knit off, but the cylinder needles do not knit off. There is thus formed a course of lock stitches which prevent the raveling back of the web. The cylinder is then by the action of the cam 13 restored to position for knitting rib work and several courses of ribbed work are knitted to present a narrow zone or strip which as the knitting continues will be raveled out by the tension placed upon the web, and thus indicate clearly on the web the line at which the stocking should be cut apart. At the conclusion of the knitting of this narrow strip of ribbed work the mechanism automatically shifts into position for the knitting of plain circular work and the cycle of operations for the knitting of the complete stocking recommences.

In the construction illustrated a means whereby the cylinder carrier may be raised and lowered and consequently the knitting off from the cylinder needles controlled has already been described.

In the construction illustrated the throwing into or out of operation of the dial needles is effected by a locking pin 124, the movement of which is controlled through suitable pattern mechanism and the movement of the dial needles to retract from knitting position holding the yarn without knitting off is effected by the locking pin 93 also controlled by suitable pattern mechanism. The details of the mechanism illustrated for effecting these results as a preferred embodiment of the present invention will now be described. The adjustable locking plate 84, which has already been described, is adjustably connected to the dial cam carrier 77 and is provided on a concentric path with holes 125, 126, 127 and stop block 128. The locking pin 124 mounted to slide vertically in a bearing 129 in the hub 69 of the yoke is moved at the proper times into one or the other of these holes or against the face of the stop block and in either position causes the dial cam carrier 77 to rotate with the yoke. This locking pin 124 is directly operated by a bell crank lever 130 fulcrumed at 131 on the hub 70 surrounding the post 61. This lever is forked at one end, the lower member of the fork 132 entering a notch in the locking pin 124 and the upper member 133 being normally pressed downwardly by a spring 134 abutting at its upper end in a recess in the hub 69. The depending arm of the bell crank lever 130 is in the path of a striker 135 pivoted at 136 to the post 38. This striker 135 is operated by a rotary face cam 137 shown in Figs. 8 and 9, and developed in Fig. 10. The lower end of the locking pin 124 is provided with a latch tongue to prevent the locking pin from dropping back into one of the holes 125, 126 or 127 after it has once been withdrawn therefrom. This latch tongue is shown at 138 as pivotally mounted at 139 in a slot in the pin 124 and a spring 140 is provided which acts to swing the tongue forwardly. The adjustable locking plate 84 is provided in the rear of each of the holes 125, 126, 127 with recesses 141. When the locking pin 124 has been raised out of engagement with one of the holes the latch tongue 138 flies forwardly and the locking pin cannot drop back into the hole. As the locking pin travels around it drops into one of the recesses 141 and finally brings up against the forward wall thus swinging the latch tongue into line with the pin and enabling the pin then to be dropped into the hole.

The movements of the locking pins 93 and 124 to secure the required results described at the proper time are effected as previously stated by suitable pattern mechanism, a preferred form of which is herein illustrated. Each locking pin is operated by a star or toothed ratchet wheel provided with a face cam and the movements of the star wheels are controlled by fixed adjustable pins carried on the top plate and by risers or movable pins brought into position at the required times by connections operated from pattern cams mounted on the pattern or cam shaft.

In the construction illustrated a separate star wheel and face cam is provided for operating each locking pin and one star wheel and face cam is mounted concentrically with the other upon the same axis. For this purpose the post 38 has extending laterally therefrom and radially of the machine a hub 142 bored to receive the shank of a pin 143 which terminates in the holddown 30 already described. A bearing member 144 surrounds the pin 143 and is screwed into the hub 142 until a shoulder 145 butts against the hub 142. The opposite end of the bearing member 144 is reduced and screw-threaded as shown at 146, and a shouldered nut 147 is threaded onto this reduced portion. A cap 148 secured to the pin 143 has a sliding connection such as the dowel pin 149 with a check nut adjacent the shouldered nut 147 and by means of this cap the holddown may be retracted against the influence of the helical spring 150 which normally acts to project the holddown in the usual manner.

The star wheel and face cam for operating the locking pin 124 are shown in detail in Figs. 7 to 10 inclusive. The star wheel 151 for operating the locking pin 124 is provided with a hub 152 connected with the hub 153 of the face cam 137 so that the two will move in unison. These parts are mounted on the bearing member 144 and held up against the hub 142 by a helical spring 154 abutting against the star wheel 151 and the shoulder of the nut 147. The connections by means of which face cam 137 when rotated operates the locking pin 124 including the striker 135 and the bell crank lever 130 have already been described and are shown in side elevation in Fig. 2.

The star wheel and face cam for operating the locking pin 93 and shown respectively at 155 and 156 are integrally or rigidly connected and are journaled upon the bearing formed by the connected hubs 152 and 153 of the other star wheel and face cam. Ball thrust bearings 157 are provided between the two star wheels and the connection between the hubs 152 and 153 is preferably a key connection, thus enabling spring 154 to hold all the parts snugly in place and yet allow of a ready movement of either of the star wheels and its connected cam.

The connections by which the face cam 156 operates the locking pin 93 are shown in detail in Fig. 3. These connections comprise a striker 158 pivoted on the opposite side of the post 38 from the striker 135 and preferably pivoted also on the same pivot pin 136; a bell crank lever 159 fulcrumed on the opposite side of the hub 70 at 160 preferably in line with the fulcrum 131; and a connection between this bell crank lever and the locking pin 93. The striker 158 contacts with the shorter arm of the bell crank lever 159 and the longer arm of the bell crank lever has a sliding connection, as by the slot and set screw illustrated in Fig. 3, with the shorter arm 161 of a bell crank lever fulcrumed at 162, and of which the longer arm 93 constitutes the locking pin. The coil spring 163 connected to the yoke 68 and the locking pin 93 serves to hold the striker 158 up against its face cam.

The top plate 4 is provided with a plurality of fixed and adjustable pins 164, 165 and 166. These pins in the construction illustrated are shown as vertical flanges projecting upwardly from plates 167 adjustably held in place by set screws 168 passing through slots therein in the top plate or supports thereon, so that these pins as required may be positioned to lie in the path of bodily travel of either or both halves of either star wheel as the star wheels revolve bodily about the vertical axis of the machine. A movable riser or pin is provided in connection with the star wheel 155 for operating the locking pin 93, being shown at 169, and another for the star wheel 156 for operating the locking pin 124 being shown at 170. The latter pin 170 in the construction illustrated is moved vertically into the path of its star wheel, while the former pin is swung radially into the path of its star wheel and suitable connections for securing these operations are made to the pattern mechanism of the machine. These connections may be sufficiently understood from Fig. 1, wherein the pin 169 is shown as fulcrumed at 171 so that its effective upper end may be swung into the path of its star wheel. A link 172 connects the lower end of the pin 169 to one arm 173 of a bell crank lever fulcrumed at 174 on the frame of the machine, and having its other arm 175 extending over into contact with a pattern mechanism such as a cam 176 on the shaft 14. The pin 170 is mounted to slide vertically in the machine and is shown as passing at its lower end through a cross-bar or cross plate 177 and provided with stop pins 178 above and below the stop bar by means of which the movement of the pin 170 is limited in either direction. One arm 179 of a bell crank lever fulcrumed at 180 engages the pin 170 while the other arm 181 is in engagement with another pattern mechanism such as the cam 176 mounted on the shaft 14.

Reverse rotation of the star wheel is prevented by a detent shown as an arm 182 pivoted to the post 38, held yieldingly downward as by a spring (not illustrated) and provided with a roller 183 riding upon the periphery of the star wheel 155.

The operation of the two locking pins may be accurately controlled by varying the number and position of the fixed adjustable pins, by varying the character of the face cams connected with the star wheels, by varying the number of teeth on the star wheels, and by varying the width or lateral position of the teeth with respect to each other. It will thus be seen that great flexibility may thus be secured in the automatic operation of the two locking pins.

A preferred construction of the two star wheels, connected cams, fixed adjustable pins and risers or movable pins for securing the desired results already described is illustrated in the drawings. The star wheel 151 and its connected cam 137 which controls the operation of the locking pin 124 is illustrated in detail in Figs. 7 to 10 inclusive. The star wheel is shown as having nine teeth 184 to 192 inclusive, and the conformation of the face cam 137 varies with each tooth as shown at 184$^a$ to 192$^a$ inclusive and respectively in Fig. 8 and in the development of that cam in Fig. 10. Three successive teeth of the star wheel 151 are cut away at the left. The fixed adjustable pins 164 and 166 are so located as only to strike the teeth of full width, and to allow the half teeth to pass by without rotating the star wheel. The riser or movable pin 170 when thrown into actuating position comes in the path of all the teeth whether they be of full width or half width. The star wheel 155 and its connected cam 156 by means of which the operation of the locking pin 93 is controlled is of a much simpler construction because its only function is at the required times to swing the locking pin 93 each time in the same direction. For this purpose the face cam 156 is divided into four substantially equal portions, two high and two low, alternating with each other, and the star wheel 155 is provided with eight teeth, every other one of which is cut away on the right side. The fixed adjustable pin 165 is so positioned as to strike only the teeth of full width and clear those teeth which are cut away at the right while the movable pin or riser 169 when brought into position must strike either tooth whether full width or cut away. Thus the pin 165 serves to position the star wheel so that when the riser or movable pin 169 is brought into position and the next tooth strikes it the locking pin 93 will be operated.

The fixed pins, it will be noted, insure that the star wheels shall always be left in proper position or in proper time no matter what may have happened to have disturbed the position of the star wheels. Sometimes in re-setting a machine the star wheels might be left out of position, sometimes by being struck they might be left out of position, and sometimes the movable pin might not drop back at the right time. Any of these occurrences and others might result in an improper operation of the machine, and it is to guard against this that the invention provides means for insuring the star wheels being left in proper position.

The operation of the construction illustrated will now be readily understood. When the machine has finished knitting a stocking the parts will be substantially in the position illustrated in the drawings with the machine just having finished casting off the last course of ribbed work formed to produce a line or zone of demarcation. Pattern mechanism then acts to move the riser 170 into the path of the star wheel 151 advancing the star wheel to bring tooth 185 to the bottom or operative position. This causes the corresponding portion of the face cam 137 through the intermediate connections to raise the locking pin 124 out of hole 125 in the adjustable locking plate 84 thus unlocking the dial cam carrier from the rotating yoke 68 and allowing it to remain stationary until the locking pin 124 sliding along drops into the next hole 126. While the locking pin 124 is moving from one hole to the other the switch cam 80 recedes, due to the pressure of the dial needles thereagainst and the fact that the pin 82 passes out of engagement with flange 90 and the dial needles go out of action. The machine is then with the locking pin 124 in hole 126 in position for plain knitting and plain knitting then proceeds throughout the foot portion. During the formation of the toe and heel pockets plain knitting is being performed, reciprocating and narrowing and widening in a manner well understood, and with which this invention is not particularly concerned. The construction of the cam head at the top of the machine which has already been described is such, however, as to enable this character of reciprocating work to be done because the yarn passing through the yarn guide 119 and the hole 120 in the plate 103 may pass freely in either direction between the dial shaft 73 and the ring 104, a feature which is novel in this invention. At the conclusion of the plain knitting of the ankle and at the point where it is desired to begin ribbed knitting the mechanism of the machine is automatically controlled to change to ribbed work and to produce the desired construction of web at the juncture between the plain and ribbed work as already explained. Riser 170 is again moved by the pattern mechanism into the path of the star wheel 151 striking tooth 185 which is cut away at the left. This brings tooth 186 which is a tooth of full width to the bottom so that it is struck by the fixed pin 166 giving the star wheel a further advance. When this tooth 186 is moved the corresponding high part of the face cam acts through the connections described to raise the locking pin 124 which thereupon is carried around and drops into hole 127 in the locking plate 89. During this movement the pin 82 rides up the depending cam projection 91 to the high part thereof and the dial needles are thus brought into position to take the yarn and knit ribbed work. Tooth 187 is now struck by the fixed pin 164 but as the face cam is flat at this point the locking pin 124 is not moved. At this time through the operation of the cam 13 the needle cylinder is lowered to a position so that while the cylinder needles take yarn they do not cast off the final course of plain knitting. No yarn was of course taken by the dial needles before they came into operation and hence as the dial needles to which yarn is now fed retract they will not cast off. Tooth 188 is now struck by the fixed pin 166 but as the portion of the face cam corresponding is flat, again the locking pin 124 is not operated. Tooth 189 is then struck by fixed pin 164 just as the dial needles have completed the taking of their first course of yarn. The portion of the face cam corresponding to tooth 189 is only half as high as the highest points of the face cam so that when it comes into operation the locking pin 124 is only raised sufficiently to take it out of hole 127 in the locking plate 84, and it, therefore, comes around against block 128. The pin 82 on the switch cam then rides off the high part of the cam projection 91 allowing the switch cam to recede under pressure of the needles and thus the dial needles to recede holding the yarn. At this time the cylinder is raised by the cam 13 to knitting position. The succeeding course of yarn is, therefore, laid only in the cylinder needles, and as this course is laid the loops of the final course of plain knitting and the last course laid are together cast off from the cylinder needles, this leaving the last course laid held only by the dial needles, and the course being laid held only by the cylinder needles. Tooth 190 is now struck by fixed pin 166 and as the corresponding part of the face cam is high locking pin 124 is raised above block 128. Tooth 191 is now struck by fixed pin 164, and as the corresponding part of the face cam is of medium or half height, locking pin 124 is held on the face of the adjustable locking plate 84 and cannot drop into the holes, and is carried past holes 125 and 126. Tooth 191 is now struck by fixed pin 164 allowing the locking pin 124 to drop onto the plate and fall into the next hole 127. The pin 82 again rides up the cam 91 bringing the switch plate and consequently the dial needles into knitting position and ribbed knitting is resumed and continues through the leg portion. This operation produces the structure of joint already described and secures the filling of the holes which would otherwise exist on the change from plain to ribbed work.

When the ribbed leg has been completed the pattern mechanism again acts and produces the welt and the lock against raveling, and the section of ribbed work to be raveled, and shows a line of demarcation already described.

During the operation of the machine the fixed pin 165 has struck a tooth of full width on the star wheel 155 bringing a tooth of half width on the star wheel 155 to lowermost position. This is the sole function of fixed pin 165 and insures a tooth of half width being brought to lowermost position so that when the riser 169 is thrown into operative position the face cam will operate, through the connections already described, locking pin 93. The pattern mechanism at the proper time then throws into position the riser 169. The star wheel 155 is shifted and the locking pin 93 moved to shift the shifting plate 89. At the next revolution the fixed pin 165 moves the star wheel 155 another point, the riser 169 remains up striking the next tooth of the star wheel, and the operation continues as long as the riser 169 is held up by the pattern mechanism. This operation causes the dial needles to take the yarn at each course and to retract carrying the yarn and to cast off at every other course while the cylinder needles are taking and casting off at every course, thus making a sort of tucking stitch by which the desired welt is produced. When the desired width of welt has been produced the pattern mechanism acts to throw the riser 169 out of operation and the rotary shifting plate is shifted by the locking pin into position to continue ribbed knitting. A narrow section of ribbed work is then knit. The cam 13 then acts to lower the cylinder by allowing all the springs 15, 16 and 17 to drop into a recess in the cam 13 for one course and during this course the cylinder needles pull down the yarn from the dial needles and the dial needles knit off, but the cylinder needles do not knit off. There is thus formed a course of lock stitches which prevent the raveling back of the web. The cam 13 then acts to raise the cylinder to knitting position and ribbed work is then knit for several courses to present a narrow zone or strip which as the knitting continues will be raveled out by the tension placed upon the web, and thus indicate where the stockings are to be cut away. At the conclusion of the knitting of this narrow strip of ribbed work the pattern mechanism again acts to throw riser 170 into operative position and tooth 192 of star wheel 151 is struck raising the locking pin 124 out of hole 127 over block 128 and allowing it to drop onto the adjustable locking plate and slide into hole 125. This shifts the pin 82 onto the flange 90 still holding the switch cam 80 outwardly, but not in knitting position, so that the last course of rib stitches are cast off the dial needles without the dial needles taking yarn. The pull of the web on this last course causes the needle butts to run against the exterior of the cam groove during the shifting of the shifting plate 89 to shift the position of the pin 82 from the high part of the cam projection 91 to the flange 90, and thus during the shift the needles do not tend to press the cam 80 inwardly. The pattern mechanism then again throws the riser 170 into position and tooth 184 of star wheel 151 is struck causing the locking pin 124 to be lifted out of hole 125 and dropped into hole 126, and thus the cycle of operations is repeated.

Having fully described our invention, what we claim as new and desire to secure by Letters Patent is:

1. A knitting machine comprising in combination a dial, a set of dial needles, a cylinder, a set of cylinder needles, means for operating the said needles to produce either ribbed, plain circular, or reciprocating work as desired, a shaft extending above and supporting the dial, a ring member surrounding said shaft and connected with the fixed frame of the machine, locking mechanism held against rotary movement with respect to the dial shaft but movable into and out of engagement with said ring member at a plurality of points, and cam means rotary in either direction to effect the engagement and disengagement at said points in sequence and thus allow the passage of the yarn in either direction between the ring and the dial shaft.

2. A knitting machine comprising in combination a dial, a set of dial needles, a cylinder, a set of cylinder needles, means for operating the said needles to produce either ribbed, plain circular, or reciprocating work as desired, a shaft extending above and supporting the dial, a ring member surrounding said shaft and connected with the fixed frame of the machine, a yarn guide revoluble in either direction about the shaft between the shaft and the ring member, and connecting means between the shaft and the ring member acting to prevent rotary movement of the shaft with respect to the ring member and acting to allow passage of the yarn carried by said yarn guide in either direction between the shaft and the ring member.

3. A knitting machine comprising in combination a dial, a set of dial needles, a cylinder, a set of cylinder needles, means for operating the said needles to produce either ribbed, plain circular, or reciprocating work as desired, a shaft extending above and supporting the dial, a ring member surrounding said shaft and connected with the fixed frame of the machine, a yarn guide revoluble in either direction about the shaft between the shaft and the ring member, a locking bolt connected with and slidable radially of said shaft to maintain one end in engagement and allow the other end to pass out of engagement with said ring member to allow the passage of the yarn between the shaft and the member and a symmetrically shaped rotary cam acting when rotated in either direction to slide said bolt back and forth bringing the ends successively out of and into engagement with the ring member thus to allow the passage of the yarn carried by said yarn guide in either direction between the shaft and ring member.

4. A knitting machine comprising in combination a dial, a set of dial needles, a cylinder, a set of cylinder needles, means for operating the said needles to produce either ribbed, plain circular, or reciprocating work as desired, a shaft extending above and supporting the dial, a ring member surrounding said shaft and connected with the fixed frame of the machine, a locking bolt connected with and slidable radially of said shaft into and out of engagement with said ring member to allow the passage of the yarn between the shaft and the member, a symmetrically shaped rotary cam mounted to rotate between said shaft and ring member and having a yarn guiding aperture and acting when rotated in either direction to slide said bolt out of and into engagement with said ring member to allow the yarn passing through said aperture to pass in either direction between the shaft and ring member.

5. In a knitting machine the combination of a dial, a shaft therefor, a set of dial needles, a dial cam carrier rotatably mounted on said shaft, cams on said carrier to actuate the dial needles, a switch device movably mounted on said carrier acting when moved outwardly to bring the needles into knitting position and when moved inwardly to allow the needles to withdraw from knitting position, a locking plate connected to and rotarily adjustable on said cam carrier, a rotary driving member on said shaft, a locking pin carried by said driving member adapted to engage the locking plate at different points and thus cause the rotation of the locking plate, pattern controlled means for causing the operation of the locking pin, a shifting plate rotarily mounted on said shaft and provided with means for controlling the switch device, a second locking pin carried by said driving member and engaging said shifting plate, and pattern controlled means for actuating said second locking pin to shift rotarily the position of the shifting plate and thus vary the control of the switch device.

6. In a knitting machine the combination of a set of dial needles, a rotary operating cam therefor, a rotary driving member, a device for connecting said member to said cam in various relative angular positions, a switch device in said cam acting when moved outwardly to bring the needles into knitting position and when moved inwardly to allow the needles to withdraw from knitting position, a device rotary with said driving member for controlling said switch device, means for shifting the angular relation of said rotary device and said driving member, and pattern controlled means for operating at predetermined times said connecting device and said shifting means whereby as determined by the pattern mechanism the needles may be placed and maintained in or out of knitting position and caused to operate in or out of knitting position.

7. A knitting machine comprising in combination a set of dial needles, a set of cylinder needles, means for operating the said needles, means for varying the knitting position of said needles, and pattern controlled means for controlling the means for operating said needles and the means for varying the knitting position of said needles to cause the cylinder needles to knit a plain web, then to bring the dial needles into action and to prevent the cylinder needles from casting off for a predetermined period, then to throw the dial needles out of action and to throw the cylinder needles into action for a predetermined period during which the cylinder needles cast off, then to bring into action the dial needles to knit rib work on both sets of needles.

8. A knitting machine comprising in combination a set of dial needles, a set of cylinder needles, means for preventing the cylinder needles from casting off for a predetermined time, means to cause the actuation of the dial needles in knitting position or out of knitting position, to cause the dial needles to retract carrying the yarn without knitting off or to stop the actuation of the dial needles and pattern controlled means to effect as required the operation of the two means aforesaid.

9. A knitting machine comprising in combination a dial, a set of dial needles, a cylinder and a set of cylinder needles, means for lowering and raising the cylinder to prevent the cylinder needles from casting off when in lowered position, means to cause the actuation of the dial needles in knitting position or out of knitting position, to cause the dial needles to retract carrying the yarn without knitting off, or to stop the actuation of the dial needles, and pattern controlled means to effect as required the operation of the two means aforesaid.

10. A knitting machine comprising in combination a set of dial needles, a rotary cam for actuating said needles, a switch plate for controlling the knitting action of said needles, a rotary element, a connecting device carried by said rotary element to connect and disconnect the rotary cam and the rotary element, a shifting device carried by said rotary element to effect the position of said switch plate, a star wheel and cam journaled on said rotary element to effect the operation of said connecting device, a second star wheel and cam journaled on said rotary element to effect the operation of said shifting device, a set of fixed pins and a riser pin for each star wheel mounted in a non-rotatable part of the machine in the path of the star wheel and pattern mechanism for operating said riser pins.

11. In a knitting machine, dial needle controlling means comprising a rotary element, a shaft mounted radially of and on said element, a star wheel journaled on said shaft and provided with a hub having a face cam, a second star wheel provided with a face cam and journaled on said hub, actuating levers operated by said face cams, and a set of fixed pins and a movable riser pin for each star wheel in the path thereof to effect the operation thereof.

12. In a knitting machine, dial needle controlling means comprising a rotary element, a shaft mounted radially of and on said element, a star wheel journaled on said shaft and provided with a hub having a face cam, a second star wheel provided with a face cam and journaled on said hub, actuating levers operated by said face cams, and a set of fixed pins and a movable riser pin for each star wheel in the path thereof to effect the operation thereof, the said star wheels having one or more teeth as required of fractional width whereby such teeth may escape contact with one or more of said pins to effect the desired operation of the star wheel.

13. In a knitting machine the combination of a dial for a set of dial needles, a dial shaft rigidly secured to said dial, a head secured against vertical movement of said shaft and provided with means to prevent rotation of said shaft, bearing members on said shaft interposed between said head and said dial, a spring interposed between two of said bearing members acting to separate them in the direction of the shaft whereby the parts surrounding the dial shaft are kept tight and rattling and lost motion is prevented.

14. In a knitting machine the combination of a dial for a set of dial needles, a dial shaft rigidly secured to said dial, a head secured against vertical movement of said shaft and provided with means to prevent rotation of said shaft, bearing members on said shaft interposed between said head and said dial, a spring interposed between two of said bearing members acting to separate them in the direction of the shaft whereby the parts surrounding the dial shaft are kept tight and rattling and lost motion is prevented, and means for vertically adjusting the dial shaft with respect to the machine frame to vary vertically the position of the dial needles.

15. In a knitting machine, the combination of a dial for a set of dial needles, a dial shaft rigidly secured to said dial, a rotatable member mounted on said dial and acting to effect the operation of the needles, a head secured against vertical movement of said shaft and provided with means to prevent rotation of said shaft, bearing members on said shaft interposed between said head and said rotatable member, a spring interposed between two of said bearing members acting to separate them and produce a braking action on the said rotatable member whereby overrunning thereof is prevented.

In testimony whereof, we have signed our names to this specification, in the presence of two subscribing witnesses.

PATRICK P. LA MONTAGNE.
PETER GABLE.

Witnesses:
HENRY O. WANGERIN,
W. A. SCHNEIDER.